April 13, 1926.

A. POULSEN ET AL

REPRODUCTION OF SPEAKING FILMS

Filed April 30, 1924

INVENTORS:

ARNOLD POULSEN AND
AXEL CARL GEORG PETERSEN

By Emil Bönnelycke
ATTORNEY

Patented Apr. 13, 1926.

1,580,762

UNITED STATES PATENT OFFICE.

ARNOLD POULSEN AND AXEL CARL GEORG PETERSEN, OF COPENHAGEN, DENMARK.

REPRODUCTION OF SPEAKING FILMS.

Application filed April 30, 1924. Serial No. 710,197.

*To all whom it may concern:*

Be it known that we, ARNOLD POULSEN, and AXEL CARL GEORG PETERSEN, subjects of the King of Denmark, residing at Copenhagen, Denmark, have invented certain new and useful Improvements in the Reproduction of Speaking Films, of which the following is a specification.

It is well known to reproduce sound waves which have been recorded on a photographic film or the like by moving the film behind a narrow slit and passing a beam of light through said slit and the record onto a cell sensitive to light, the cell being included in a telephonic circuit in which the current is caused to vary by reason of the variation of the light to which the cell is exposed.

In order to obtain a clear and distinct reproduction, the width of the slit must be extremely narrow. However, the disturbing interference phenomenon, due to the passage of the light rays through the narrow slit, limits the extent to which the width of the slit can be reduced and renders it impossible to obtain a clear reproduction.

It has, therefore, been proposed to form an enlarged image of the record on a screen having a narrow slit disposed transversely of the direction of movement of the enlarged image of the record. The width of the slit is determined in accordance with the dimensions of the graphic sound-impressions in the said enlarged image, the width of the slit being as small as possible for obtaining clear reproduction without disturbing interference.

Now, if an exact and clear reproduction is to be obtained, the width of the slit must not exceed half of the width of a period of a sound wave record of the highest periodicity on the enlarged phonogram. If under these conditions sound waves of a very high periodicity, for instance soprano notes or other higher musical tones, are to be reproduced clearly, the slit must either be so narrow as to cause interference, or the degree of enlargement must be so great that it is necessary to use an inconveniently intensive source of light.

The object of the present invention is to eliminate these drawbacks, which are due to the use of the slit in a reproduction system in which an enlarged image of the record is used.

The invention consists in the formation of the enlarged image of the record on the light-sensitive cell itself, without the use of any slit in the path of the rays between the record and the cell. The width of the sensitive cell must not be so large that the individual graphic sound impressions overlap in the reproduction, and according to the invention the sensitive cell is therefore made linear.

In the accompanying drawing—

Figure 1:
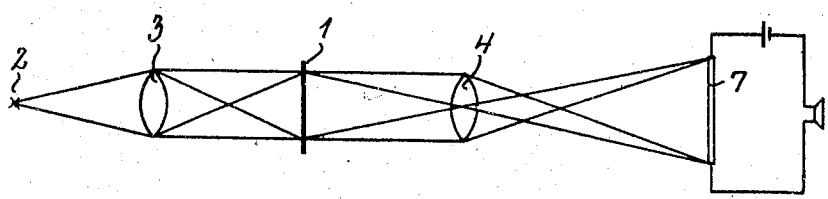
Figure 2:
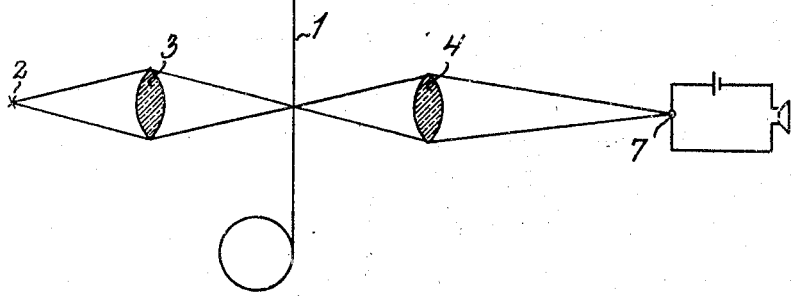
Figure 3:
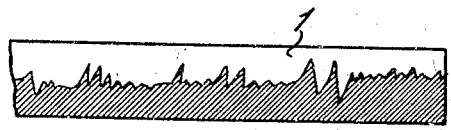

Figure 1 represents a diagrammatic plan view of a reproduction system according to the invention; while Fig. 2 is a side view thereof, and Fig. 3 is an enlarged fragmental sectional view of a phonogram.

Referring to the drawing, 1 indicates a photographic film whereon the sound waves are graphically recorded, as indicated in Fig. 3, by means of optical devices, and which is illuminated by a source of light 2 through a lens 3. By means of a lens 4, an enlarged image of the illuminated portion of the phonogram on the film 1 is formed on the surface of a light-sensitive cell 7, for example a selenium cell, so that a part of said image covers the said cell 7. The cell 7 is linear and is arranged at a right angle to the longitudinal direction of the film 1.

The cell 7 is inserted in known manner in an electric circuit wherein the current is varied in accordance with the variation of the surface of the cell which is exposed to light during the movement of the phonogram, which latter consists for example of a uniformly dark band (Fig. 3), the width of which, transversely to the film, varies in accordance with the sound vibrations.

By illuminating the light sensitive-cell 7 through the phonogram, the light projected onto cell will be of uniform intensity, but the length of cell surface which is illuminated will vary with the width of the phonogram in the enlarged image formed on the surface of the cell, and due to the linear shape of the latter, so that the light passing two individual sound signs in juxtaposition on the film cannot at one time illuminate the cell. Therefore, the sounds are not intermingled during reproduction but are quite clear and distinct.

We claim as our invention:

1. The process of reproducing sounds, comprising the steps of passing light through a moving phonogram, and forming an enlarged image thereof across a linear light-sensitive cell elongated transversely of the line of travel of the film and included in a reproducing circuit.

2. A sound-reproducing system, embodying a source of light for illuminating a movable film having a phonogram recorded thereon, a linear light-sensitive cell elongated transversely of the line of travel of the film, means interposed between the light source and the cell and adapted to form an enlarged image of the illuminated phonogram across the linear light-sensitive cell, and a reproducing circuit wherein the cell is inserted.

3. The process of reproducing sounds, comprising the steps of passing light through a moving phonogram, and forming an enlarged image thereof across a linear light-sensitive cell which is elongated transversely of the line of travel of the film and which has a width not exceeding the width of half a period of a sound representation of the highest periodicity in an enlarged image of a sound record projected on the cell, such cell being included in a reproducing circuit.

4. A sound reproducing system according to claim 2, in which the linear light-sensitive cell has a width which does not exceed the width of half a period of a sound representation of the highest periodicity in an enlarged image of a sound record projected on the cell.

In testimony whereof we affix our signatures.

AXEL CARL GEORG PETERSEN.
ARNOLD POULSEN.